United States Patent
Dao et al.

(10) Patent No.: US 9,929,571 B1
(45) Date of Patent: Mar. 27, 2018

(54) INTEGRATED ENERGY STORAGE SYSTEM

(71) Applicant: Elite Power Solutions LLC, Tempe, AZ (US)

(72) Inventors: Yuan Dao, Phoenix, AZ (US); William Jeffrey Schlanger, Flagstaff, AZ (US)

(73) Assignee: Elite Power Solutions LLC, Chandler, AZ (US)

( * ) Notice: Subject to any disclaimer, the term of this patent is extended or adjusted under 35 U.S.C. 154(b) by 116 days.

(21) Appl. No.: 15/084,330

(22) Filed: Mar. 29, 2016

(51) Int. Cl.
*H02J 7/14* (2006.01)
*H02J 7/00* (2006.01)
*H02S 40/38* (2014.01)
*H02J 7/02* (2016.01)

(52) U.S. Cl.
CPC ............ *H02J 7/0013* (2013.01); *H02J 7/007* (2013.01); *H02J 7/02* (2013.01); *H02S 40/38* (2014.12)

(58) Field of Classification Search
CPC .... H02J 1/102; H02J 3/383; H02J 2007/0067; H02J 3/32; H02J 7/0013; H02J 7/0016; H02J 2007/0037; H02J 7/0026; H02J 7/0055; H03K 17/102; H03K 17/122; H03K 17/145
USPC ................ 320/101, 112, 116–117, 127–128, 320/137–138
See application file for complete search history.

(56) References Cited

U.S. PATENT DOCUMENTS

| | | | |
|---|---|---|---|
| 6,406,806 B1 | 6/2002 | Keshula et al. | |
| 8,219,333 B2 | 7/2012 | Li | |
| 8,258,747 B2 | 9/2012 | Andres et al. | |
| 2004/0249534 A1 | 12/2004 | Yamada et al. | |
| 2005/0170256 A1* | 8/2005 | Cummings | H01M 4/5825 429/322 |
| 2007/0176604 A1 | 8/2007 | Morimoto | |
| 2011/0140650 A1 | 6/2011 | Zhang et al. | |
| 2011/0234231 A1 | 9/2011 | Liu et al. | |
| 2011/0279087 A1 | 11/2011 | Andres et al. | |
| 2012/0091968 A1* | 4/2012 | Heo | H02J 7/35 320/138 |
| 2012/0319658 A1 | 12/2012 | White et al. | |

\* cited by examiner

*Primary Examiner* — Nghia Doan
(74) *Attorney, Agent, or Firm* — Invention to Patent Services; Alex Hobson (57) ABSTRACT

An integrated battery control system for energy storage incorporates a power control system to reliably provide power to a load and protects lithium ion batteries from over-charging and over-discharging. One or more power sources, such as renewable power sources, such as solar or wind power generators, or a generator, may be coupled with the integrated battery control system to provide power for charging the battery pack and/or for supplying power to said load. A portion of the power from a power source may be used to charge the battery pack and a portion may be provided to a load. A control circuit and one or more microprocessors may control the components of the system to provide power in an efficient manner. Power to and from the battery may run through an inverter and a control system may open and close switches to control flow of power in the system.

20 Claims, 4 Drawing Sheets

INTEGRATED ENERGY STORAGE SYSTEM

BACKGROUND OF THE INVENTION

Field of the Invention

The present invention relates to an integrated battery control system and particularly to an integrated battery control system that receives input power from a plurality of sources including a renewable power source, such as solar panels or wind power generators, that can be used to charge the battery pack and/or supply power to a load.

Background

Lithium batteries can be damaged if discharged to too low of a voltage or overcharged to too high of a voltage. Typically, batteries are charged by a connection to the grid. As the cost of energy increases, more people are turning to alternative power supply sources including renewable power supplies such a solar power generation devices and wind power generators. While still others are adopting fuel cells and other power supply sources. Electricity is at a premium during the day and early evening when there is a high demand for power and it is less expensive at night, when the power demand drops. When connecting a battery pack to a grid, the cost of the power may vary depending on the time of day.

Lithium ion batteries require special controls in many applications as they require monitoring of their state of charge to ensure that they are not operated below a threshold voltage value and/or are not over charged. Lithium batteries can be irreversibly damaged if operated below a threshold voltage value. Lithium batteries may lose their ability to be fully charged if they are operated below a threshold voltage for too long. When a plurality of batteries are coupled together, it is important to keep the level of charge of each battery as close as possible to that of the other batteries to prevent damage and to achieve maximum capacity. For example, the cell voltage range for lithium ion batteries may be between 2.5 and 3.8V.

Figure 1:
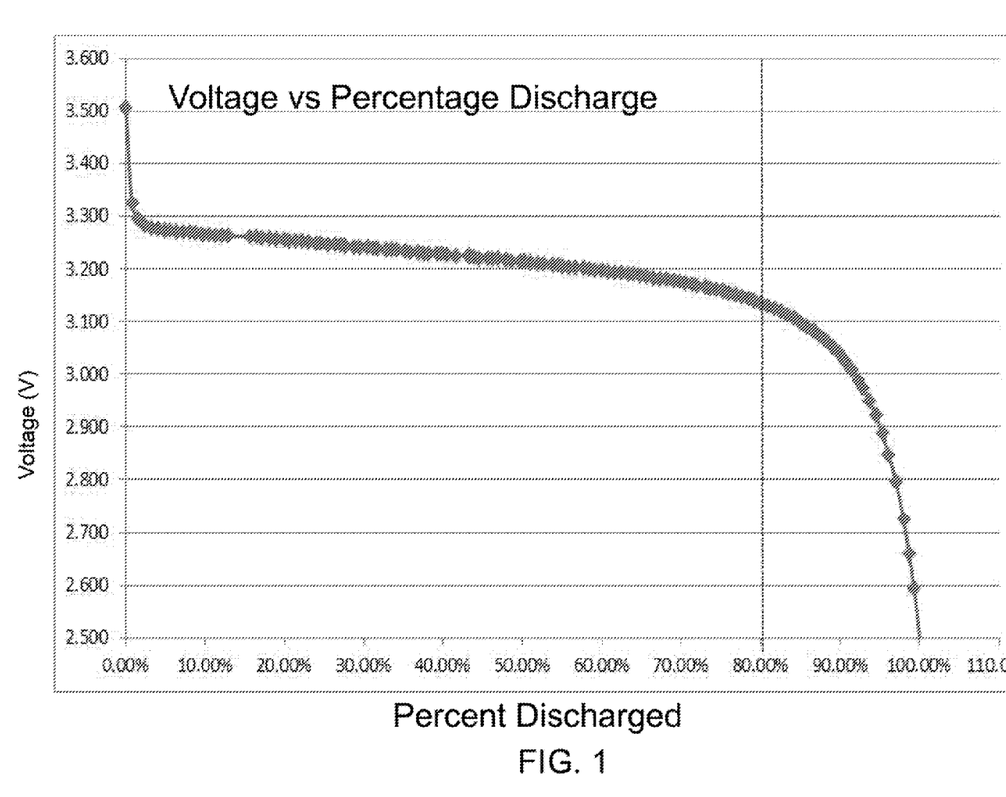
FIG. 1 shows an exemplary discharge profile for a lithium battery.

As shown in FIG. 1, lithium batteries have a non-linear discharge profile, with a relatively flat discharge region up to about 80% discharged. Therefore, a small change in voltage can mean a large difference in the state of charge, unlike a lead acid battery that has a relatively linear drop in voltage as the battery is discharged. The state of charge of a lead acid battery, and therefore the amount of power remaining, is more easily monitored by a battery monitoring system by simply measuring the voltage of the lead acid battery. The amount of power remaining in a lithium battery system is more difficult to monitor and predict by simply measuring voltage. It would therefore be more difficult to determine the available power remaining in a lithium battery unit by simply measuring the voltage.

Current charging systems are configured to charge a battery pack to a predetermined voltage. However, the individual batteries within a battery pack may not be charged to the same level, and the discrepancy between the batteries' state of charge levels can cause capacity to be limited. The battery pack capacity is limited to the capacity of the lowest battery unit. Additionally, when a battery has a lower state-of-charge level, as the battery discharges, it may discharge to a level resulting in permanent loss of charging capacity.

Current battery management systems obtain data about individual batteries in a battery unit. The systems reserve addresses for communication with battery unit sensors and/or battery units. When sensors transmit data about battery units to the management system, the sensors include the address of the battery unit. Such a system may require significant amounts of resources and complex arrangements for connecting the components of the system.

There exists a need for an integrated battery control system that controls the flow of power from a plurality of input sources, including a renewable power source, to charge a battery pack and/or to supply power to a load.

SUMMARY OF THE INVENTION

The invention is directed to an integrated battery control system that is particularly useful for energy storage in a battery pack and supply of power from a plurality of power supply devices including a renewable power source. In an exemplary embodiment, one or more power supply devices are coupled with the integrated battery control system through input connections. Each of these connections may comprise a shunt to measure the incoming current of the power supply device. The shunts may provide the measured current input to a control microprocessor, part of the power control system. The input power, from any of the power supply devices, may be provided to a load through an inverter, and/or to charge the battery pack. When the battery pack is below a threshold state of charge, at least a portion of the input power supply may be directed to charge the battery pack, and a portion may be provided to a load through an inverter. The control of the flow of power to and from the battery pack is controlled by the control system and may be configured to preferentially, when connected to the grid, store energy when the rates are low and supply power from the battery pack when the rates are higher. Input power supply devices include renewable power sources, auxiliary power supply devices including generators, fuel cells and the like. In addition, an input power supply may be a grid power input, wherein power from a grid may be used to charge the battery pack and/or may be delivered to a load. In addition, power from one of the other power supply devices and/or the battery pack may be diverted back to the grid. An inverter may be coupled with or be part of the integrated battery control system to convert incoming and outgoing power as required for battery charging and/or supply to a load.

An exemplary integrated battery control system may utilize power from the grid during periods of low energy rates to charge the batteries within the system and then discharge the batteries during periods of higher energy rates to thereby reduce energy costs. For example, the batteries of the integrated battery control system may be charged late at night when the cost of electrical energy from the grid is at the lowest rate. Then when the energy rates increase, such as during the day or early evening, the integrated battery control system may discharge the batteries and utilize no, or a reduced draw of, energy from the grid. The integrated battery control system of the present invention may be suitable for home energy storage systems, thereby reducing a home owner's energy costs, or for industrial and grid scale energy systems.

A renewable power source may be coupled with the integrated battery control system and provide power to a load through an inverter and/or charge batteries. A renewable power source, as used herein, requires no fuel to operate and includes, but is not limited to, solar power generating devices, such as solar panels, photovoltaic cells and the like, wind power generating devices, such as wind turbines, and the like, and hydroelectric power generating devices and the like. A solar power renewable power source may comprise one or more solar panels having photovoltaics for producing electric power from solar energy. A wind power renewable power source may comprise one or more wind turbines for creating electrical power from the wind. A hydroelectric power source, or power generating device, may comprise one or more water turbines for creating electric power from the flow of water.

Control of incoming and outgoing power to and from a power control system can be complicated. Any number of sensors may be required to determine the state of charge of the batteries, as well as the available power from external sources, such as a power grid, a generator, a renewable power source and the like. In one embodiment, the integrated battery control system monitors the current or power to or from the batteries and calculates the state of charge of the battery system therefrom. Renewable power sources may require additional sensors to determine the power level produced by the renewable power source and a means to convert this power to an appropriate form, such as an inverter that converts direct current (DC) power otherwise used for charging the batteries to an appropriate form for delivery to a load or power grid, alternating current (AC). An integrated power management system, as described herein, may divert at least a portion of incoming power from a renewable power source from a charging mode, where it is charging the rechargeable batteries, to a delivery mode, wherein it is coupled with a load through an inverter or to a power grid. An inverter may be required to convert the power produced by a renewable power source to an appropriate form for delivery to a load or to a power grid.

An exemplary integrated battery control system may be coupled with a rechargeable battery pack, one or more renewable power sources, an inverter and a power grid. An exemplary integrated battery control system may include a shunt or other sensor to measure a power level provided from the battery pack, a renewable power source or auxiliary power supply device, and incorporates a power control system. The integrated battery control system incorporates safety features to protect the batteries and ensure proper charging of the batteries and to maintain the batteries above a threshold state of charge. In an exemplary embodiment, the integrated battery control system incorporates a battery management system as described in U.S. patent application Ser. No. 13/077,136, entitled Battery Management System, and incorporated herein by reference. In other exemplary embodiments, the integrated battery control system incorporates components of an uninterrupted battery power supply system as described in U.S. patent application Ser. No. 14/225,251, entitled Uninterrupted Lithium Battery Power Supply System and incorporated, in its entirety, by reference herein.

In an exemplary embodiment, the integrated battery control system for energy storage comprises a control enclosure having a computing device that receives input from a battery unit monitoring module, a renewable power supply input, a battery power input, a grid power connection, an output power connector and one or more shunts to measure the current flowing into and out of the system. An exemplary integrated battery control system may be configured in a single control enclosure having attachments or ports for the inputs/outputs to simplify installation and maintenance. An exemplary integrated battery control system may be coupled with one or more inverters to convert power supply as required for charging the batteries or supply to a load or power grid.

An exemplary integrated battery control system for energy storage comprises a power control system comprising a computing device configured in a control enclosure having an output data request port and an input data port. The input data port receives data from a battery unit monitoring module and the output data request port is coupled with the battery unit monitoring module for the purpose of requesting data. An exemplary battery unit monitoring module, as described herein, monitors the state of charge of a battery pack and/or individual batteries within a battery pack. In addition, an exemplary integrated battery control system may comprise a temperature sensor to monitor the temperature of a battery within a battery pack. An exemplary battery unit monitoring module may be coupled directly with the battery pack and may send data regarding the battery pack and/or individual batteries in the battery pack to the computing device through the input data port. A physical connection, such as by one or more wires, may be made between the battery unit monitoring module and the input data port and/or the data request port. In another embodiment, the battery unit monitoring module communicates with the input data port and/or the output data request port wirelessly. A wireless transmitter and receiver may be coupled with the input data port, the output data request port and/or the battery unit monitor module as required to enable wireless communication.

A battery power input of the control enclosures receives power from the battery pack, and a shunt coupled therewith measures the current flow to or from the battery pack. Additional information regarding the battery pack or an individual battery within the battery pack may be received from a battery management system. When the state of charge of the batteries drops below a threshold level, or when the battery power level drops below a lower threshold power level, the batteries may be charged by an input power supply device, including a renewable power source. Power generated by a renewable power source may be converted, as required, to enable charging of the battery pack. In an exemplary embodiment, when the incoming power provided by the renewable power supply is below a threshold level, the battery pack may be charged by power delivered from an auxiliary power supply device or from a power grid through a power grid connection.

In another embodiment, when the batteries are above an upper threshold power level, or substantially charged, and the renewable power source is providing power above a renewable power supply threshold level, at least a portion of the power supplied by the renewable power source may directed to the power grid through the grid power connection. One or more Metal-Oxide Semiconductor for Field Effect Transistors, (MOSFET), switches may be coupled with the battery pack and configured to stop charging the battery pack when the battery pack is above a threshold state of charge. An exemplary integrated battery control system for energy storage may preferentially charge the battery pack with power from the renewable power source over charging the batteries from grid power or another charger.

An exemplary integrated battery control system for energy storage may comprise one or more inverters for converting incoming or outgoing power. For example, an output inverter may be configured to convert an output power supply to AC power. This output power supply may be from a renewable power source or from the battery pack. Likewise, an input inverter may convert an incoming power to DC for the purposes of charging the batteries.

A renewable power source is a power source that requires no consumable fuel, such as hydrogen, fossil fuels and the like and includes solar panels, wind power generating system, hydroelectric systems, geothermal systems and the like. An exemplary integrated battery control system for energy storage may charge the battery pack solely from a renewable power source and thereby require no power from a power grid. An exemplary solar panel may comprise one or more photovoltaic panels and a wind power generating system may comprise a wind turbine.

An exemplary integrated battery control system for energy storage may further comprise an auxiliary charger input configured to connect with an auxiliary charging device. An auxiliary charging device is not a power grid or a renewable power source, as described herein and may generate electricity through the use of a fuel, such as a fuel cell or a fossil fuel burning generator.

An exemplary integrated battery control system for energy storage may be coupled with a power grid though a grid power connection. In one embodiment, the integrated battery control system for energy storage provides power to the power grid, such as from the battery pack or from a renewable or auxiliary power source. In this embodiment, an inverter may convert the incoming power from the renewable or auxiliary power source, or from the battery pack to AC power before being delivered to the power grid. In another embodiment, the integrated battery control system receives power from the power grid through the grid power connection for the purposes of charging the battery pack or for supply to a load. In this embodiment, a shunt may be coupled with the grid power connection to measure the grid power supply level. An input inverter may also be configured between the grid power connection and the battery pack to convert the AC power to DC power for charging the batteries.

The flow of power to and from a battery pack is controlled by a pair of MOSFETs, wherein a first and second MOSFET are configured in series with a battery pack. A MOSFET is a switch with a diode in parallel. In an exemplary embodiment, two of these MOSFETs are connected in series with the drains connected together, such that they become a switch that can control the flow of power so that it can flow in one direction, both directions or not at all. The control system is configured to stop charging of the battery pack when the battery pack is above a threshold state of charge by turning on the first MOSFET and turning off the second MOSFET, thereby enabling discharge of the battery pack only. The control system is configured to stop discharge of the battery pack when the battery pack is below a threshold state of charge by turning off the first MOSFET and turning on the second MOSFET, thereby enabling charging of the battery pack only. When both MOSFETs are on, power to and from the battery pack may flow freely, wherein power supplied to a load is provided in part by power from the battery pack and one or more of the input power supply devices. When both MOSFETs are off, power to and from the battery pack is disabled, such as when there is an alarm condition, such as an over-temperature condition of one or more of the batteries within the battery pack.

A power control system, as described herein, may comprise a plurality of lithium batteries or a connection thereto. Any suitable number of batteries may be configured in a battery unit or battery pack including, but not limited to, two or more, three or more, four or more, six or more, ten or more, twenty or more and any range between and including the quantities provided. Power is drawn from a battery pack and a battery pack may comprise any number of battery units. A battery unit comprises two or more lithium batteries that may be configured in series or in parallel. In an exemplary embodiment, a battery pack comprises two battery units, each battery unit comprising four lithium batteries in series. Each lithium battery may be maintained in a stand-by condition, or charge of approximately 3.375V, for example, to ensure an output voltage of 3.0 volts per battery on average when the battery pack is required for back-up power. This battery pack, having a ready voltage of 27V, may be used in a power control system that is configured to provide a 24V output, for example.

A lithium battery, as used herein, comprises lithium metal or lithium compounds in the anode. Lithium batteries have a very high charge density, or long life, and can operate at temperature extremes. The lifetime of a lithium battery may be as much as ten times greater than a lead-acid battery. In addition, lead-acid batteries have a somewhat limited effective operating temperature range. Lithium batteries can produce voltages from 1.5 to 3.7V.

The power control system is configured to monitor and control the supply of output power. An exemplary power control system comprises a battery power input and an inverter connection, whereby leads from a battery pack and an AC power supply can be connected, respectively. A plurality of power output switches may be controlled by a computing device that monitors the system by receiving input data and utilizing control programs for operating the system.

Output power may be delivered by the battery pack until a low voltage threshold is reached by a battery unit, or an individual battery within the battery pack, or when the battery pack drops below a threshold voltage. The power control system may provide an alert that the battery power is approaching a low threshold value.

An exemplary power control system may also comprise a power output connector, such as a plug, whereby an external device requiring an electrical power supply can be connected. Any number of power output connectors may be configured on a power control system, such as one, two, three, five, more than five and the like.

An exemplary integrated battery control system may comprise a sensor to detect any leakage current, or a GFI function. When the system detects any leakage current from battery to ground, it will activate an alarm.

A battery monitoring module is coupled to each of the batteries for direct monitoring of battery status data such as voltage, and in some cases temperature, of the battery and may be coupled with a thermistor. A battery monitoring module may comprise a voltage dividing network for the purpose of measuring the battery voltage. A battery monitoring module may comprise an analog-to-digital converter that measures a voltage of said batteries. In an exemplary embodiment, a battery monitoring module is connected between a positive and negative terminal of a battery and is physically located on the battery. A module connector may couple a first battery monitoring module to a second battery monitoring module. In embodiments with a larger number of individual batteries in a battery unit, a plurality of module connectors may be configured in a daisy-chain from one battery to the next.

In an exemplary embodiment, an integrated battery control system comprises a wireless battery management system, as described in U.S. patent application Ser. No. 14/657,248, to Yuan Dao, et al. A physical cable may be coupled between the battery monitoring module and the battery data input for the transfer of data and requests. In an alternative embodiment, a wireless transmitter may transmit a request for data or send data, and a wireless receiver may be configured for receipt of this information. A wireless transmission system for receiving battery data from a battery unit monitor module is described in U.S. patent application Ser. No. 14/225,251, filed on Mar. 25, 2014, entitled Uninterrupted Lithium Battery Power Supply System; the entirety of which is incorporated by reference herein. A wireless transmitter may be coupled with the computing device and may send a request for battery monitoring module data. A wireless receiver coupled with a first battery monitoring module may receive this request and may then send data about the first battery and/or battery unit to the battery data input through a wireless transmitter. Again, a wireless signal receiver may be coupled with the battery data input to provide this data to the computing device. Any suitable configuration of wireless receivers and transmitters may be used to reduce the number of physical connections between a battery pack and a power control system. A battery data input may be coupled to a battery monitoring module through a cable or wirelessly. A battery data input may comprise a wireless signal receiver that is configured to receive a wireless signal having battery unit parameter data. A wireless signal generator may be coupled with a battery monitoring module. Likewise, a data request output may comprise a wireless signal that is received by a wireless signal receiver of a battery monitoring module.

A power control system, as described herein, may comprise a battery balancing system as described in U.S. Pat. No. 8,732,482 entitled Battery Unit Balancing System, to Dr. Dao, which is hereby incorporated by reference in its entirety.

In an exemplary embodiment, a power control system comprises a program to determine the state of charge of a battery unit or battery, or the amount of available charge remaining. The calculation takes into account the battery unit or pack voltage prior to the utilization of battery power as the output power. The program utilizes input related to the power being drawn by the powered device, such as current, voltage and time, and calculates the total power usurped from the battery pack. The program can then calculate the discharge percent of the battery pack, as depicted in FIG. 1. A power control system may calculate the time remaining before the battery pack is discharged 80% and may send an alert via a data transmission system of the remaining time before shut-down. A power control system may shut-down the battery pack if a discharge level of 80% or more is reached, for example, in an effort to protect the system and prevent damage to the battery pack.

A power control system, as described herein, may be configured, or programmed, to send a signal via a data transmission system to an external device. For example, a phone call, text message, email alert, or any other suitable signal, such as a signal configured to be received by a monitoring station, may be sent when an error, limit value or emergency level value is detected. For example, a battery monitoring module may measure and monitor temperatures of individual batteries and may detect a temperature above a threshold or emergency limit set in the computing device. When the computing device receives this data, a signal may be sent via the data transmission system regarding the over-temperature condition. The power control system may be configured to send a special signal in the event of any out of limit condition detection including, a high voltage condition, low voltage condition, high current condition, low current condition, high temperature condition, loss of AC power, loss of output power or a connection fault condition. A power control system, as described herein, may be configured to shut off battery charging when the computing device detects a high voltage condition on a battery or battery unit. In another embodiment, a power control system, as described herein, may be configured to discontinue power draw from a battery unit in the event of a low voltage condition.

The summary of the invention is provided as a general introduction to some of the embodiments of the invention, and is not intended to be limiting. Additional example embodiments including variations and alternative configurations of the invention are provided.

BRIEF DESCRIPTION OF THE DRAWINGS

The accompanying drawings are included to provide a further understanding of the invention and are incorporated in, and constitute a part of this specification, illustrate embodiments of the invention and together with the description serve to explain the principles of the invention.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown in FIG. 1, a lithium battery has a non-linear discharge profile. The discharge rate from approximately 5% to 80% of full charge is substantially linear but has a very small slope. Therefore, it is difficult to estimate the state of charge of a battery, or battery unit by measuring the voltage. Small variations in voltage may result in erroneous estimates of the state of charge. As described herein, a power control system may calculate the time remaining before a battery pack should be shut down when being used as the output power supply. The power control system and specifically the computing device may initiate battery shut down if a calculated value of 80% discharged or more is reached.

Figure 2:
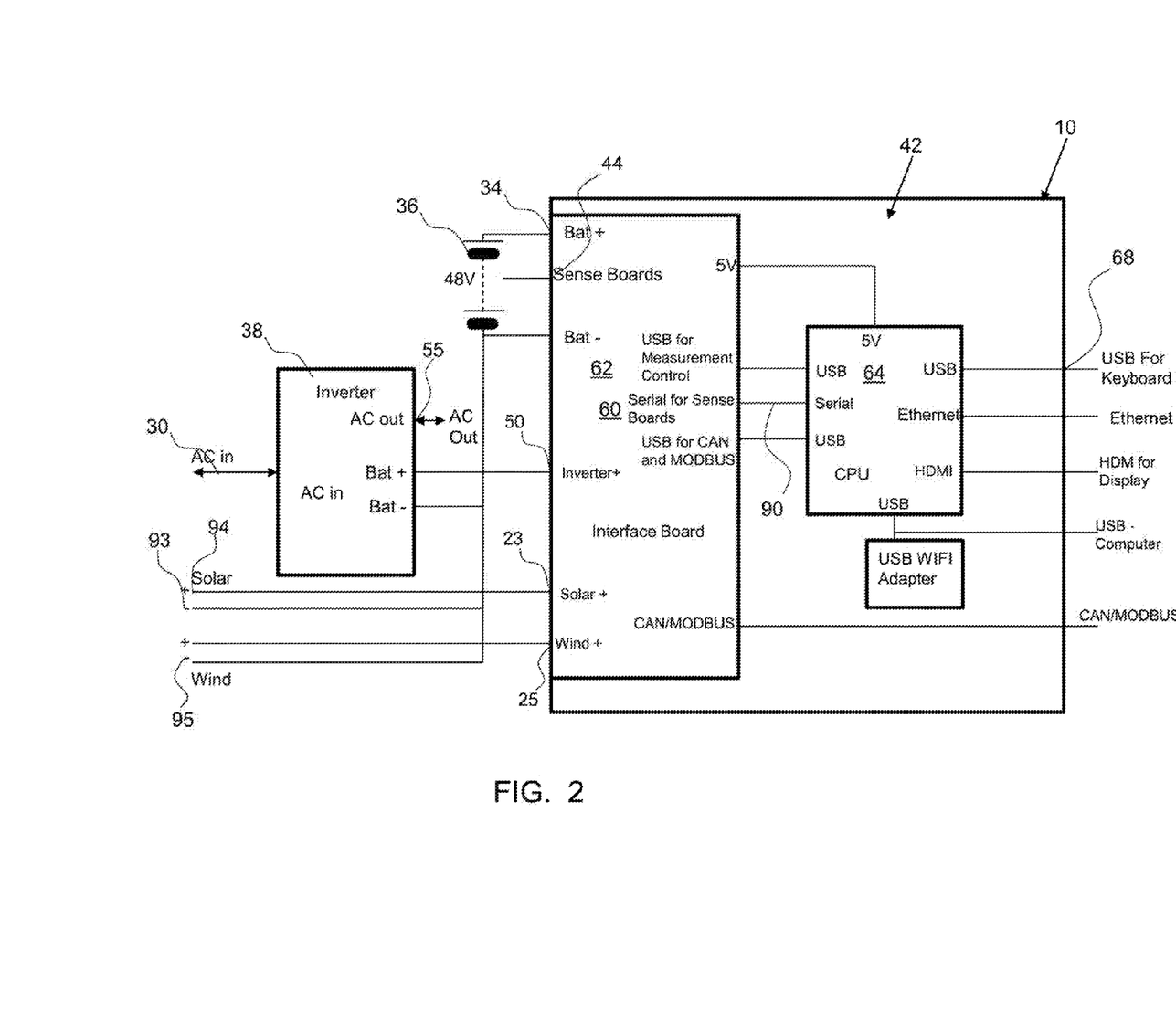
FIG. 2 shows a block diagram of an exemplary integrated battery control system.

As shown in FIG. 2, an exemplary power control system 42 of an integrated battery control system 10 comprises a plurality of power supply device inputs, a connection to a battery pack and a computing device. A battery pack 36 is connected to the power control system 42 at the battery pack connection 34. A solar power device is connected at a solar power supply input 23 and a wind power device is connected at a wind power supply input 25. A power output connection 50 directs power to an inverter 38 having a power output connection 55 to a load. A power grid connection 30 is directed through the inverter 38. The exemplary power control system 42 comprises a computing device 60 having two separate microprocessors, a control microprocessor 62 that receives inputs regarding current levels and controls the flow of power to and from the battery pack, and a communication microprocessor 64 that has one or more user interface connections 68, such as a USB connection, Ethernet connection, HDMI connection for display of system parameters including battery state of charge, and a MODBUS connection. The control and communication microprocessors are coupled together by a USB connection, as shown.

Figure 3:
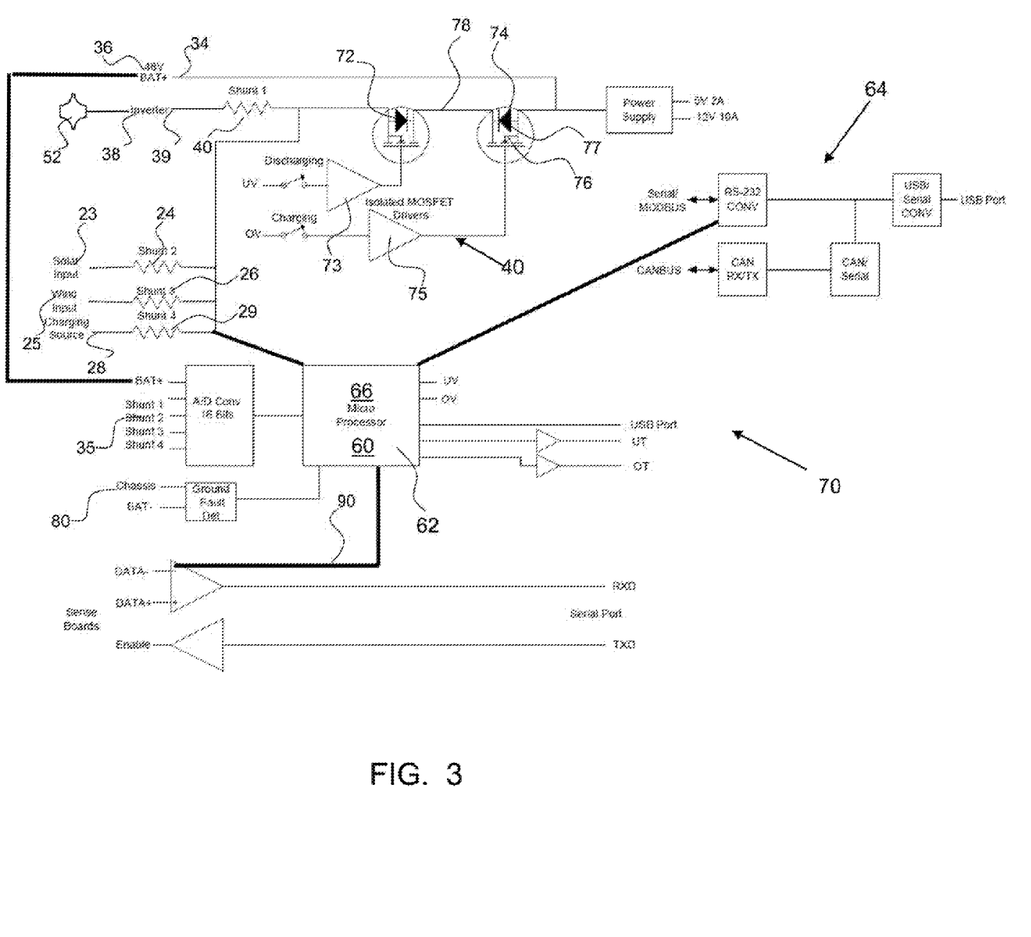
FIG. 3 shows diagram of an exemplary power control system having a control circuit of an integrated battery control system.

As shown in FIG. 3 a control circuit 70 diagram shows the various inputs and outputs to integrated energy storage system. A solar power supply input 23, wind power supply input 25 and auxiliary power input 28 all have shunts, 24, 26 and 29 respectively, to measure the level of power supply incoming to the system. The incoming power supply level information measured from these shunts is provided to the control microprocessor 66 of the computing device 60. A control program 62 of the microprocessor dictates and controls the flow of power to and from the battery pack 36. Power to and from the battery pack is controlled by a first MOSFET 72 and a second MOSFET 74. Each MOSFET comprises a diode 77 and a switch 76 configured in parallel. The first and second MOSFETs are configured in series between the battery power input and the power output connector. The drain 78 of the two MOSFETs are connected such that the flow of power can be controlled in a first direction, an opposing second direction, or stopped completely. The power control system 40 is configured to stop charging of the battery pack when the battery pack is above a threshold state of charge by turning on the first MOSFET 72 and turning off the second MOSFET 74, thereby enabling discharge of the battery pack only. The control system is configured to stop discharge of the battery pack when the battery pack is below a threshold state of charge by turning off the first MOSFET 72 and turning on the second MOSFET 74, thereby enabling charging of the battery pack only. The control system is configured to stop flow through the MOSFETs completely when both the first and second MOSFETs are turned off. When both MOSFETs are on, power flow through them is not restricted and power may flow from and to the battery pack. MOSFET drivers 73, 75 are controlled by the control microprocessor 66. Power output from the integrated energy storage system flows to an inverter connection 39 and through a shunt 40 before being provided to a load 52 or a power grid. A shunt 35 also enables measurement of the current flowing to and from a battery pack. A sense board connection 90 provides important information about the battery pack and/or individual batteries within the battery pack. A chassis connection 80 enables ground fault detection.

Figure 4:
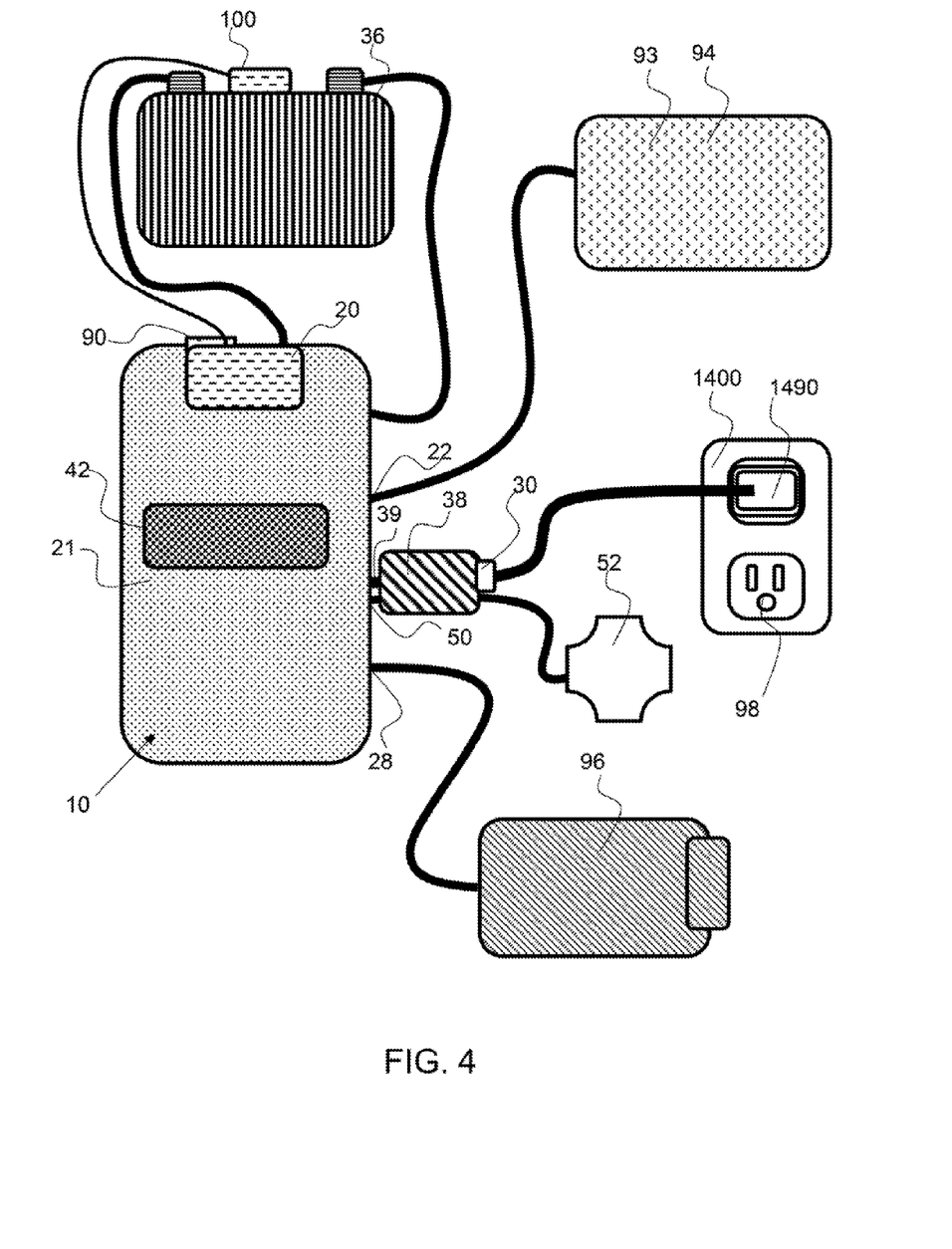
FIG. 4 shows an exemplary integrated battery control system for energy storage coupled to a load.

As shown in FIG. 4, an exemplary integrated battery control system 10 for energy storage comprises a power control system 42 configured within a control enclosure 21 having a plurality of input and outputs. A battery management system 20 is coupled with a battery pack 36 having a battery monitoring module 100. The battery monitoring module is coupled with the integrated battery control system through an output data request port and an input data port or a sense board connection 90. Information about the state of charge of the battery is provided to the integrated battery control system and a computing device monitors the state of charge of the battery pack to determine when charging is required. In an exemplary embodiment, when the battery pack drops below a threshold state of charge, the computing device is programmed to charge the batteries through one of the input power supplies, including the renewable power source 93, such as a solar panel 94 as shown, a power grid 98 and an auxiliary charging device 96. An inverter 38 may be configured between the power grid 98 and the power grid connection 30 and is connected to the enclosure 21 by an inverter connection 39. A wall outlet 1400 having a plug 1490 couples the grid power 98 to the integrated battery control system 10. A renewable power supply is coupled to the integrated battery control system enclosure 21 at a renewable power source input 22. The auxiliary power supply 96 is coupled to the integrated battery control system enclosure 21 at an auxiliary power source input 28. The output power connection 50 provides power from the integrated battery control system 10 to a load 52 through an inverter 38.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An integrated battery control system for energy storage comprising:
   a control enclosure comprising:
      a computing device having a control program;
      a power control system comprising:
         a battery power input coupled with a battery pack configured to receive a battery power supply to the power control system;
         a shunt coupled with the battery power input that measures a battery power supply level of the battery pack;
         a renewable power source input that is coupled with a renewable power source for receiving a renewable power supply to the power control system;

a shunt coupled with the renewable power source input that measures a renewable power supply level of the renewable power supply;
an inverter connection for connection to an inverter;
a power output connector configured for connection to a load through said inverter that receives the renewable power supply from the renewable power source input;
a control circuit comprising:
a first MOSFET;
a second MOSFET;
wherein the first and second MOSFETs are configured in series between the battery power input and the power output connector;
wherein the power control system is configured to stop charging of the battery pack when the battery power supply level is above an upper threshold battery power supply level by turning on the first MOSFET and turning off the second MOSFET, thereby enabling discharge of the battery pack only;
wherein the power control system is configured to stop discharging of the battery pack when the battery power supply level is below a lower threshold battery power supply level by turning off the first MOSFET and turning on the second MOSFET, thereby enabling charging of the battery pack only;
wherein said inverter is configured to convert an output power supply to AC power connected to the load;
wherein said output power supply is supplied by the renewable power source when the battery power level is above said upper threshold battery power supply level and the renewable power supply level is above a renewable power supply threshold level;
wherein said output power supply is supplied by the battery pack when the battery power supply level is above a lower threshold power supply and the renewable power supply level is below a lower threshold renewable power supply level.

2. The integrated battery control system for energy storage of claim 1, wherein the renewable power source comprises a solar panel.

3. The integrated battery control system for energy storage of claim 1, wherein the renewable power source comprises a wind power device.

4. The integrated battery control system for energy storage of claim 1, wherein the renewable power source comprises a hydroelectric power device.

5. The integrated battery control system for energy storage of claim 1, wherein the power control system further comprises:
a grid power connection coupled with a power grid and configured for receiving a grid power supply to the integrated battery management system through said inverter, and
a shunt coupled with the grid power connection that measures a grid power supply level.

6. The integrated battery control system for energy storage of claim 5, wherein the power control system connects the renewable power supply to the grid power connection, through the inverter, to supply the renewable power supply to the power grid when the battery power supply level is above the lower threshold battery power supply level.

7. The integrated battery control system for energy storage of claim 5, wherein the power control system charges the battery pack with the grid power supply, through the inverter, when the battery power supply level is below the lower threshold battery power supply level.

8. The integrated battery control system for energy storage of claim 5, wherein the power control system charges the battery pack with the grid power supply, through the inverter, when the battery power supply level is below the lower threshold battery power supply level and the renewable power supply is below a renewable power supply threshold level.

9. The integrated battery control system for energy storage of claim 5, wherein the power control system further comprises:
an auxiliary power supply input configured to receive an auxiliary power supply from an auxiliary charging device to the integrated battery management system through said inverter, and
a shunt coupled with the auxiliary power supply input that measures an auxiliary power supply level.

10. The integrated battery control system for energy storage of claim 9, wherein the power control system connects the auxiliary charging device to the grid power connection, through the inverter, to supply the auxiliary power supply to the power grid when the battery power supply level is above the lower threshold battery power supply level.

11. The integrated battery control system for energy storage of claim 9, wherein the power control system charges the battery pack with the auxiliary power supply, through the inverter, when the battery power supply level is below the lower threshold battery power supply level.

12. The integrated battery control system for energy storage of claim 9, wherein the power control system charges the battery pack with the grid power supply, through the inverter, when the battery pack is below the upper threshold state of charge and the auxiliary power supply is below a threshold auxiliary power supply level.

13. The integrated battery control system for energy storage of claim 1, wherein the power control system further comprises:
an auxiliary power supply input configured to receive an auxiliary power supply from an auxiliary charging device to the integrated battery management system through said inverter, and
a shunt coupled with the auxiliary power supply input that measures an auxiliary power supply level.

14. The integrated battery control system for energy storage of claim 13, wherein the power control system charges the battery pack with the auxiliary power supply, through the inverter, when the battery power supply level is below the lower threshold battery power supply level.

15. The integrated battery control system for energy storage of claim 1, wherein the computing device comprises a control microprocessor that receives current input from the shunts and controls turning on and off the first and second MOSFETs.

16. The integrated battery control system for energy storage of claim 1, wherein the computing device comprises a communication microprocessor that is coupled with a communication input to the control enclosure, wherein instructions are provided to the communication microprocessor through said communication input.

17. The integrated battery control system for energy storage of claim 1, further comprising a battery monitoring module, configured to measure a state of charge of a battery in the battery pack.

18. A method of storing and providing power comprising the steps of:
a) providing an integrated battery control system for energy storage comprising:

a control enclosure comprising:
  a computing device having a control program;
  a power control system comprising:
    a battery power input coupled with a battery pack configured to receive a battery power supply to the power control system;
    a shunt coupled with the battery power input that measures a battery power supply level of the battery pack;
    a renewable power source input that is coupled with a renewable power source for receiving a renewable power supply to the power control system;
    a shunt coupled with the renewable power source input that measures a renewable power supply level of the renewable power supply;
    a grid power connection coupled with a power grid and configured for receiving a grid power supply to the integrated battery management system through said inverter, and
    a shunt coupled with the grid power connection that measures a grid power supply level
    an inverter connection for connection to an inverter;
    a power output connector configured for connection to a load through said inverter that receives the renewable power supply from the renewable power source input;
    a control circuit comprising:
      a first MOSFET;
      a second MOSFET;
    wherein the first and second MOSFETs are configured in series between the battery power input and the power output connector;
  wherein the power control system is configured to stop charging of the battery pack when the battery power supply level is above an upper threshold battery power supply level by turning on the first MOSFET and turning off the second MOSFET, thereby enabling discharge of the battery pack only;
  wherein the power control system is configured to stop discharging of the battery pack when the battery power supply level is below a lower threshold battery power supply level by turning off the first MOSFET and turning on the second MOSFET, thereby enabling charging of the battery pack only;
  wherein said inverter is configured to convert an output power supply to AC power connected to the load;
  wherein said output power supply is supplied by the renewable power source when the battery power level is above said upper threshold battery power supply level and the renewable power supply level is above a renewable power supply threshold level;
  wherein said output power supply is supplied by the battery pack when the battery power supply level is above a lower threshold power supply and the renewable power supply level is below a lower threshold renewable power supply level;
  b) charging the battery pack with power from the power grid during a period of low energy rates; and
  c) discharging the battery pack to said load during a period of higher energy rates than said period of low energy rates; whereby the cost to power the load is reduced.

19. The method of storing and providing power of claim 18, further comprising the steps of:
  charging the battery pack with power from the renewable power source;
  discharging the battery pack to said load during a period of higher energy rates than said period of low energy rates; whereby the cost to power the load is reduced.

20. The method of storing and providing power of claim 18, further comprising the steps of:
  connecting the renewable power supply to the grid power connection, through the inverter, to supply the renewable power supply to the power grid when the battery power supply level is above the lower threshold battery power supply level.

* * * * *